(12) United States Patent
Huang (10) Patent No.: US 6,814,633 B1
(45) Date of Patent: Nov. 9, 2004

(54) WAVE POWERED VESSEL

(76) Inventor: Lung-Pin Huang, No.1, Lane 2, Cheng-Kung, Ta-She Hsiang, Kaohsiung Hsien (TW)

( * ) Notice: Subject to any disclaimer, the term of this patent is extended or adjusted under 35 U.S.C. 154(b) by 0 days.

(21) Appl. No.: 10/636,700

(22) Filed: Aug. 8, 2003

(51) Int. Cl.⁷ .................................................. B63H 9/02
(52) U.S. Cl. ............................................................ 440/9
(58) Field of Search .......................... 440/9, 10; 290/53; 60/497, 498, 499, 500, 501, 502, 503, 504, 505, 506, 507

(56) References Cited

U.S. PATENT DOCUMENTS

| | | | | |
|---|---|---|---|---|
| 559,969 A | * | 5/1896 | Delmonte | 60/507 |
| 560,002 A | * | 5/1896 | Knudson | 440/9 |
| 1,066,896 A | * | 7/1913 | Frame | 440/9 |
| 4,389,843 A | * | 6/1983 | Lamberti | 60/507 |
| 4,560,884 A | * | 12/1985 | Whittecar | 290/42 |
| 4,622,473 A | * | 11/1986 | Curry | 290/53 |

* cited by examiner

*Primary Examiner*—Sherman Basinger
(74) *Attorney, Agent, or Firm*—Nixon & Vanderhye P.C.

(57) ABSTRACT

A wave powered vessel includes a plurality of float members suspended by a suspending member on a hull body and movable upwardly and downwardly relative thereto with the rising and falling tides. A plurality of power units, such as gear trains or force pumps, are coupled respectively to the float members to rotate a driven shaft in a uni-direction so as to drive a propeller, thereby propelling the hull body forward.

4 Claims, 7 Drawing Sheets

PATENT

WAVE POWERED VESSEL

BACKGROUND OF THE INVENTION

1. Field of the Invention

This invention relates to a vessel powered by an inexhaustible energy source, more particularly to a wave powered vessel.

2. Description of the Related Art

With the gradual depletion of oil resources and humankind's mounting demands for energy, development of alternative fuels is becoming more and more important. It is known in the art to use regenerative energy sources, such as solar energy, wind energy, and ocean tides, to produce electric power. However, devices using these regenerative energy sources have various setbacks. For instance, solar energy conversion is not efficient, and requires the use of a large number of thermal collectors, which occupy a large amount of space. The use of wind power to generate electricity is limited to windy regions. Electricity generation utilizing ocean tides is also limited to coastal regions having tides of sufficient range.

SUMMARY OF THE INVENTION

The object of the present invention is to provide a wave powered vessel which permits rotation of a propeller to propel the vessel forward by wave motion.

According to this invention, the wave powered vessel includes a hull body extending in a longitudinal direction, a propeller mounted to be rotatable relative to the hull body, and adapted to be submerged in a body of water so as to propel the hull body forward, and a driven shaft mounted to drive the propeller to rotate.

A drive transmission shaft is disposed in and is rotatable relative to the hull body about a rotation axis, is adapted to be spaced apart from the water level in an upright direction, and extends in the longitudinal direction to couple with the driven shaft so as to drive the propeller to rotate. A suspending member is mounted relative to the hull body, and extends in the longitudinal direction. A plurality of float members are suspended by and are movable relative to the suspending member in the upright direction, and are disposed to be displaced from one another in the longitudinal direction. Each of the float members includes bottom and top walls opposite to each other in the upright direction, and a force transmitting rod disposed to extend from the top wall uprightly. The force transmitting rod includes a rack segment disposed to be moved upwards and downwards with the force transmitting rod when a respective one of the float members is moved upwards and downwards respectively by rising and falling tides. A plurality of gear trains are mounted on the hull body. Each of the gear trains includes a uni-directional gear unit and a driven wheel. The uni-directional gear unit has a toothed wheel that meshes with the rack segment so as to be rotated clockwise and counterclockwise, and a uni-directional gear wheel coupled relative to the toothed wheel to permit the uni-directional gear wheel to be rotated coaxially with the toothed wheel only when the toothed wheel rotates clockwise. The driven wheel is disposed downstream of the uni-directional gear wheel so as to transmit rotation of the uni-directional gear wheel to drive the drive transmission shaft, thereby driving the propeller to rotate.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENT

Figure 1:
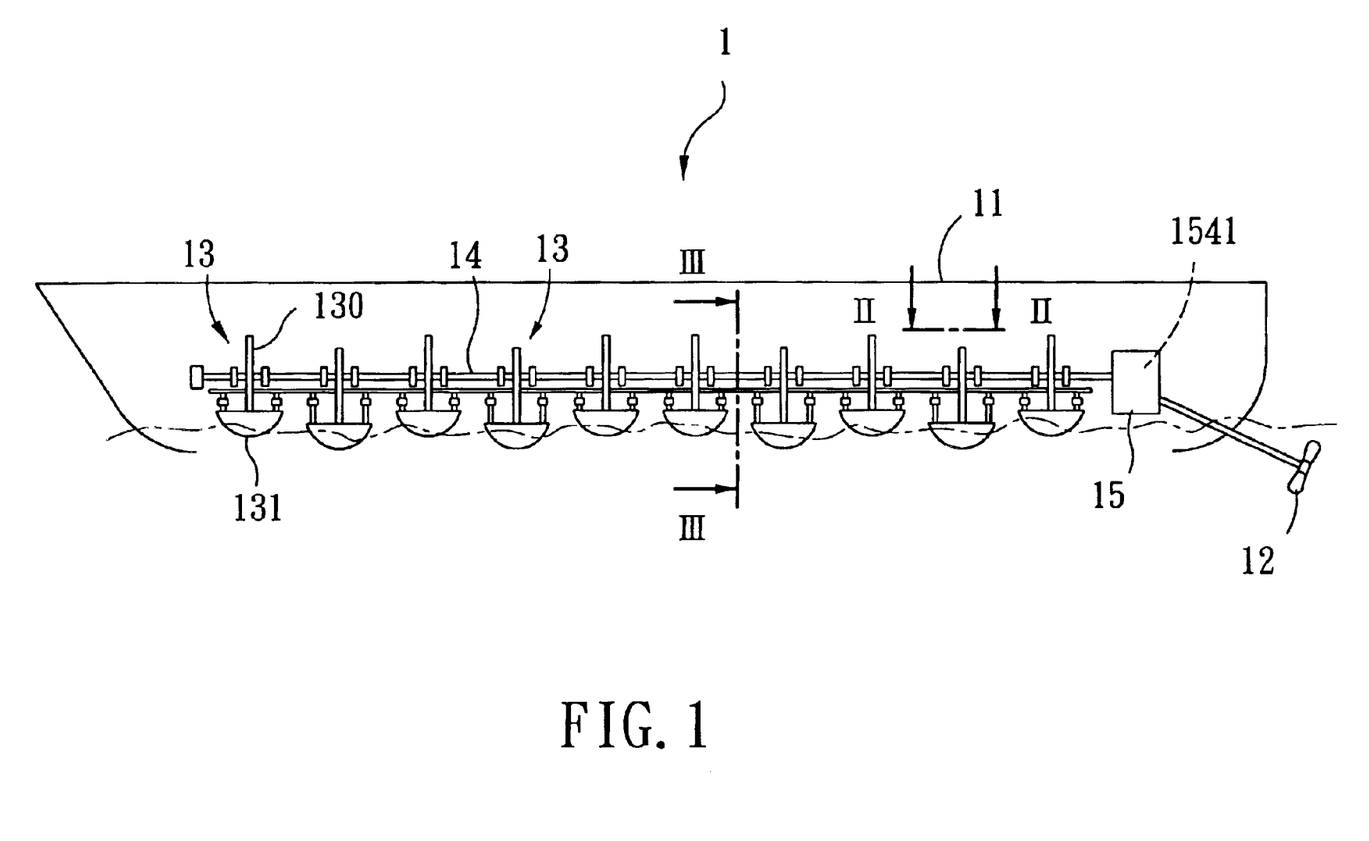
FIG. 1 is a schematic view of a first preferred embodiment of a vessel according to this invention.
Figure 2:
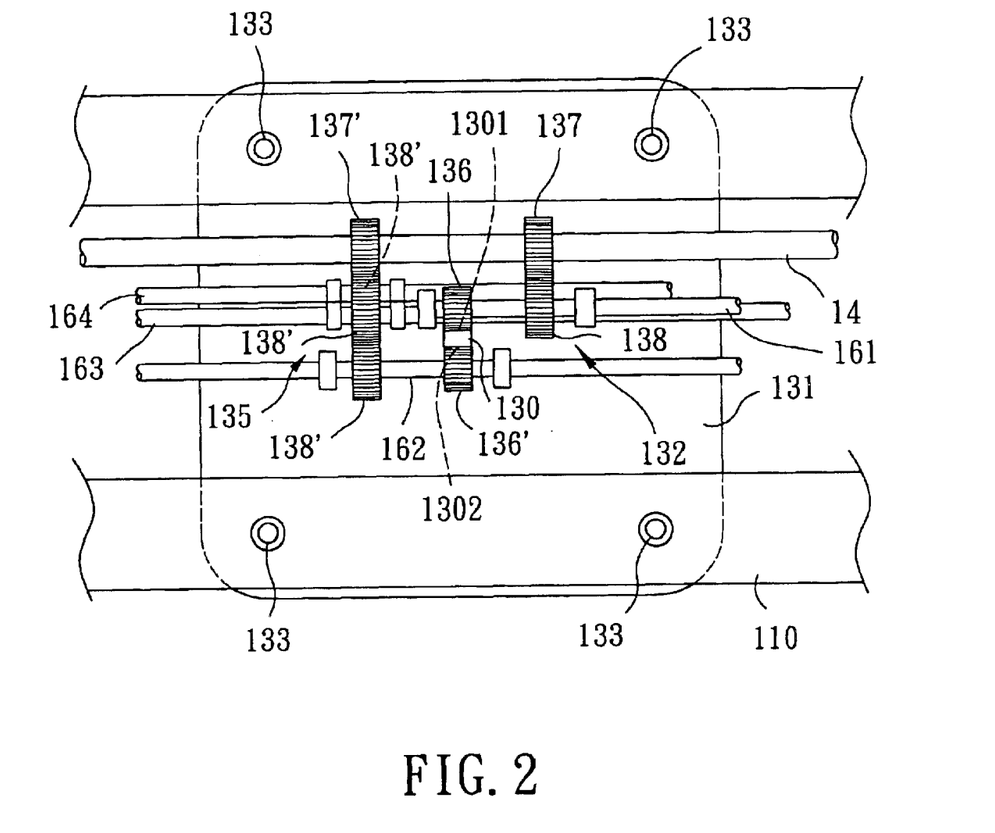
FIG. 2 is a partly sectional view of the first preferred embodiment shown in FIG. 1, taken along lines II—II thereof.
Figure 3:
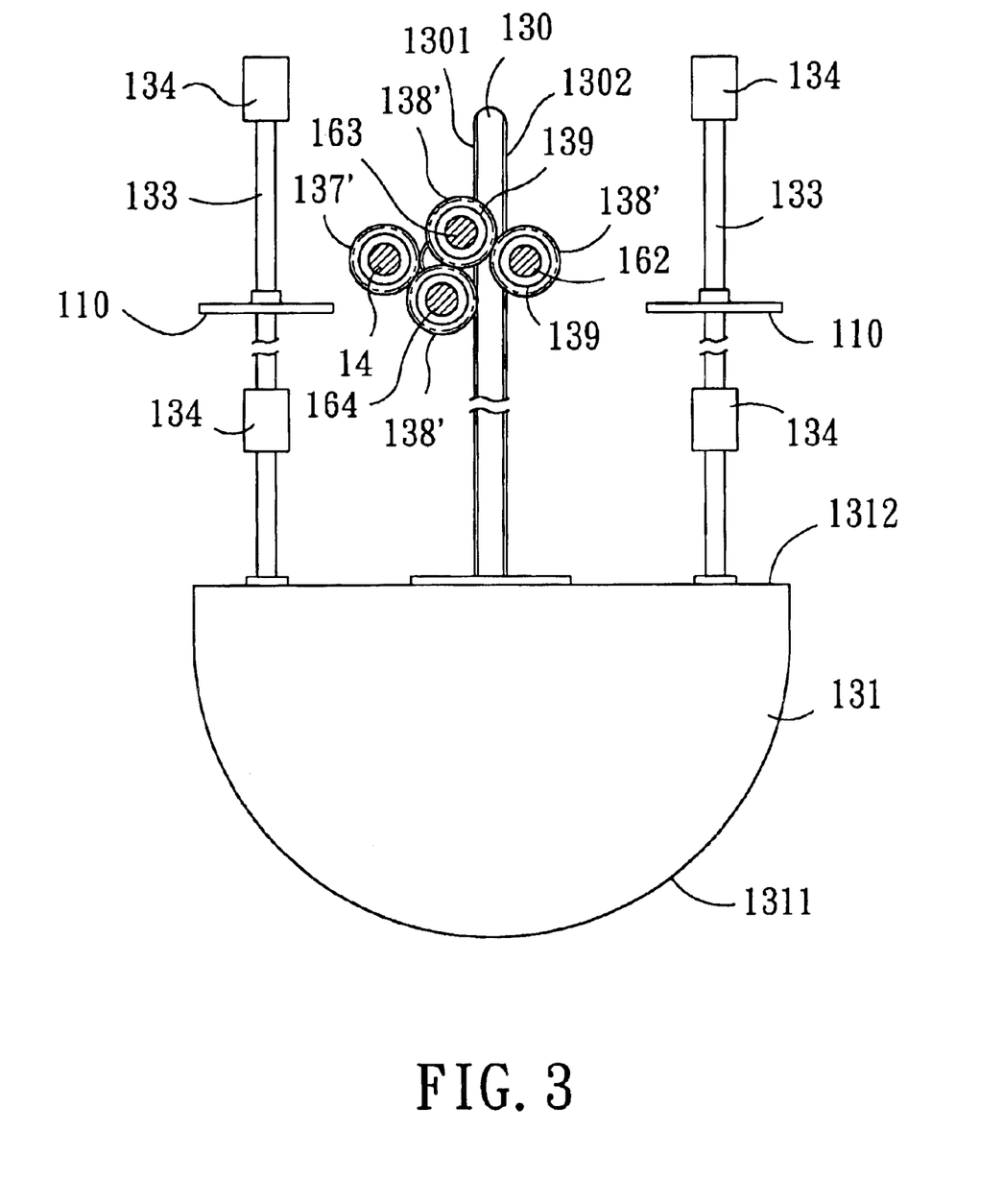
FIG. 3 is a partly sectional view of the first preferred embodiment shown in FIG. 1, taken along lines III—III thereof.

Referring to FIGS. 1 to 3, the first preferred embodiment of a wave powered vessel 1 according to the present invention is shown to comprise a hull body 11 which extends in a longitudinal direction, a propeller 12, a power converting unit 15, a drive transmission shaft 14, and a plurality of power units 13.

The propeller 12 is mounted to be rotatable relative to the hull body 11, and is adapted to be submerged in a body of water so as to propel the hull body 11 forward.

Figure 4:
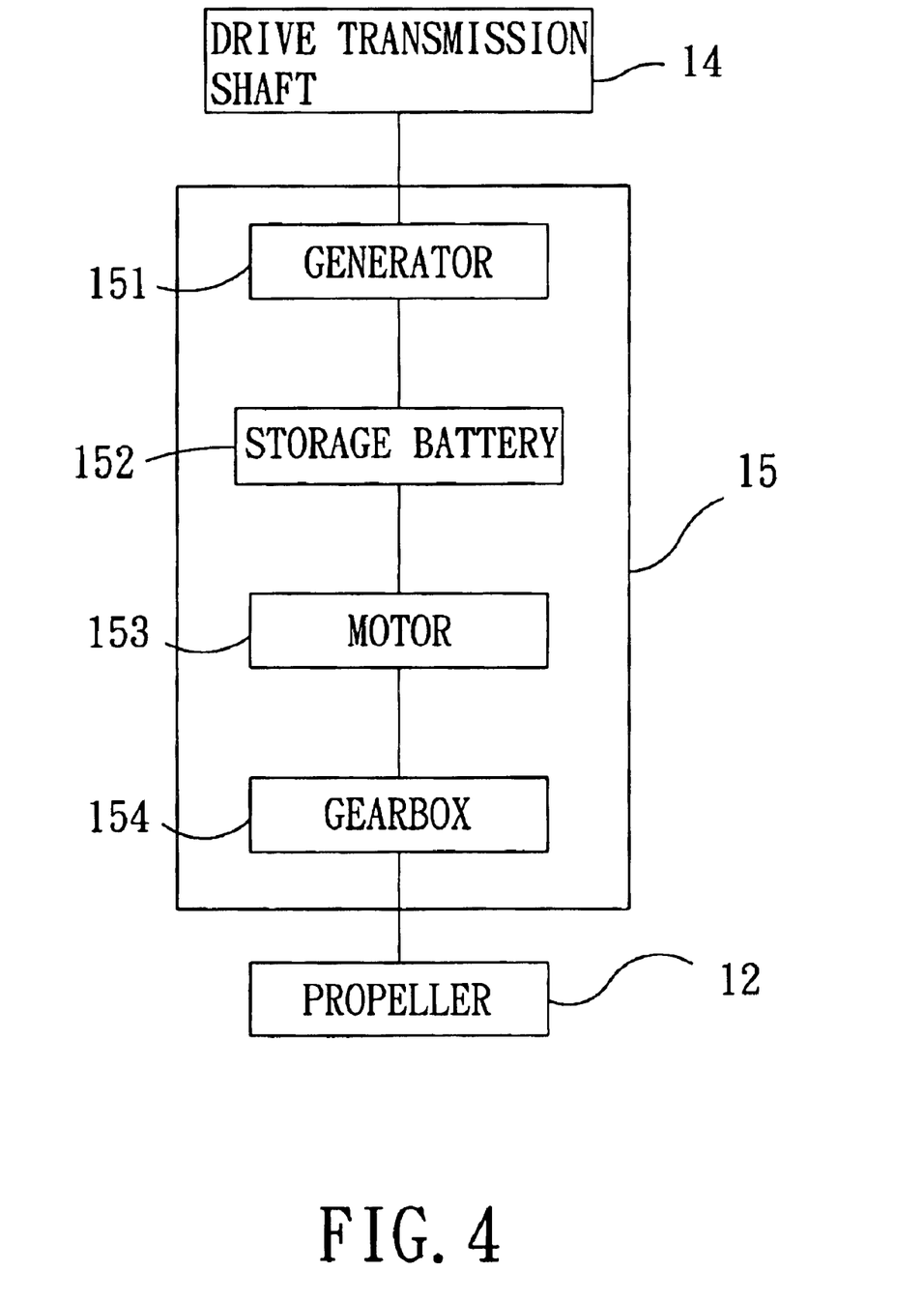
FIG. 4 is a block diagram of a power converting unit of the first preferred embodiment.

The power converting unit 15 has a known construction, and includes a generator 151, a storage battery 152, a motor 153, and a gearbox 154 (see FIG. 4). The gearbox 154 has a driven shaft 1541 which is mounted to drive the propeller 12 to rotate.

The drive transmission shaft 14 is disposed in and is rotatable relative to the hull body 11 about a rotation axis, and is adapted to be spaced apart from the water level in an upright direction. The drive transmission shaft 14 extends in the longitudinal direction to couple with the driven shaft 1541 of the gearbox 154 of the power converting unit 15 so as to drive the propeller 12 to rotate.

A suspending member 110 includes a plurality of sleeves which are secured to the hull body 11, and which extend in the longitudinal direction.

Each of the power units 13 includes a float member 131, a plurality of guiding rods 133 (four in this embodiment), a first gear train 132, and a second gear train 135.

All the float members 131 of the power units 13 cooperate to provide a floating force for supporting the vessel 1 on the water. Preferably, the floating force is provided by half of the float members 131. In addition, the float members 131 are displaced from one another in the longitudinal direction.

Each of the float members 131 has bottom and top walls 1311, 1312 which are opposite to each other in the upright direction and which are respectively adapted to be submerged below and floating above the water level, and a force transmitting rod 130 which is disposed to extend from the top wall 1312 uprightly. The force transmitting rod 130 includes first and second rack segments 1301, 1302 opposite to each other in a transverse direction that is transverse to both the upright direction and the longitudinal direction so as to be moved upwards and downwards with the force transmitting rod 130 when the float member 131 is moved upwards and downwards by the rising and falling tides.

Each of the guiding rods 133 includes a lower segment which is connected to and which extends uprightly from the top wall 1312 of the respective float member 131, and an upper segment which extends from the lower segment through and upwardly of the suspending member 110 so as to suspend the float member 131 from the suspending member 110, thereby guiding upward and downward movements of the respective float member 131 relative to the suspending member 110 in the upright direction. Furthermore, upper and lower limit members 134 are respectively disposed on the upper and lower segments of each of the guiding rods 133 so as to limit excessive upward and downward movements of the respective float member 131.

The first gear train 132 includes a first uni-directional gear unit and a first driven wheel 137. The first uni-directional gear unit has a first toothed wheel 136 which surrounds a first axis, and which is disposed to mesh with the first rack segment 1301 of the force transmitting rod 130 so as to be rotated clockwise and counterclockwise, and a first uni-directional gear wheel 138 which is coupled to the first toothed wheel 136 by means of a support shaft 161 so as to permit the first uni-directional gear wheel 138 to be rotated coaxially with the first toothed wheel 136 by means of uni-directional bearings (not shown) disposed between the first toothed wheel 136 and the support shaft 161 and between the uni-directional gear wheel 138 and the support shaft 161 only when the first toothed wheel 136 rotates clockwise.

The first driven wheel 137 is disposed to mesh with the first uni-directional gear wheel 138, and is coupled to the drive transmission shaft 14 by means of a uni-directional bearing (not shown) so as to transmit rotation of the first uni-directional gear wheel 138 to drive the drive transmission shaft 14, thereby driving the propeller 12 to rotate.

The second gear train 135 includes a second uni-directional gear unit and a second driven wheel 137'. The second uni-directional gear unit has a second toothed wheel 1361 which surrounds a second axis that is parallel to the first axis, and which is disposed to mesh with the second rack segment 1302 of the force transmitting rod 130. As such, when the first toothed wheel 136 is rotated clockwise and counterclockwise, the second toothed wheel 136' is rotated counterclockwise and clockwise correspondingly. The second uni-directional gear unit further has a plurality of second uni-directional gear wheels 138', which include first, second and third gear wheels 138' in this embodiment. The first gear wheel 138' is coupled to the second toothed wheel 136' by means of a support shaft 162, and meshes with the second gear wheel 138'. The second gear wheel 138' further meshes with the third gear wheel 138'. As shown in FIG. 3, a plurality of uni-directional bearings 139 are respectively disposed between the first, second and third gear wheels 138' and the corresponding support shafts 162, 163, 164 such that the support shafts 162, 163, 164 can rotate only when the second toothed wheel 136' rotates clockwise.

The second driven wheel 137' is disposed to mesh with the third gear wheel 138', and is coupled to the drive transmission shaft 14. As such, the first uni-directional gear wheel 138 and the first gear wheel 138' can rotate clockwise in an alternate manner to drive the drive transmission shaft 14, thereby enabling the drive transmission shaft 14, as well as the propeller 12, to perform continuous rotary movements when the float members 131 are moved upwards and downwards by the rising and falling tides.

When the float member 131 of each power unit 13 is moved upward by a rising tide, the force transmitting rod 130 is moved upwards so as to permit clockwise rotation of the first toothed wheel 136. The rotational force of the first toothed wheel 136 is transmitted to the first uni-directional gear wheel 138 and the first driven wheel 137 so as to drive the drive transmission shaft 14. On the other hand, the upward movement of the force transmitting rod 130 permits counterclockwise rotation of the second toothed wheel 136'. Due to the provision of the uni-directional bearings 139, the counterclockwise rotational force of the second toothed wheel 136' will not be transmitted to the second uni-directional gear wheels 138' so that the second toothed wheel 136' is in an idle state.

When the float member 131 of each power unit 13 is moved downward by a falling tide, the force transmitting rod 130 is moved downwards so as to permit clockwise rotation of the second toothed wheel 136'. The rotational force of the second toothed wheel 136' is transmitted to the second uni-directional gear wheels 138' and the second driven wheel 137' so as to drive the drive transmission shaft 14. On the other hand, the downward movement of the force transmitting rod 130 permits counterclockwise rotation of the first toothed wheel 136. Due to the provision of the uni-directional bearings (not shown), the counterclockwise rotational force of the first toothed wheel 136 will not be transmitted to the first uni-directional gear wheel 138 so that the first toothed wheel 136 is in an idle state.

Therefore, the clockwise rotational forces of the first and second toothed wheels 136,136' can be alternately transmitted to the drive transmission shaft 14 so as to drive continuously the drive transmission shaft 14 as well as the propeller 12 by virtue of the rising and falling tides.

Note that the gearbox 154 can not only control the rotational speed of the propeller 12, it can also be used to steer the propeller 12.

Figure 5:
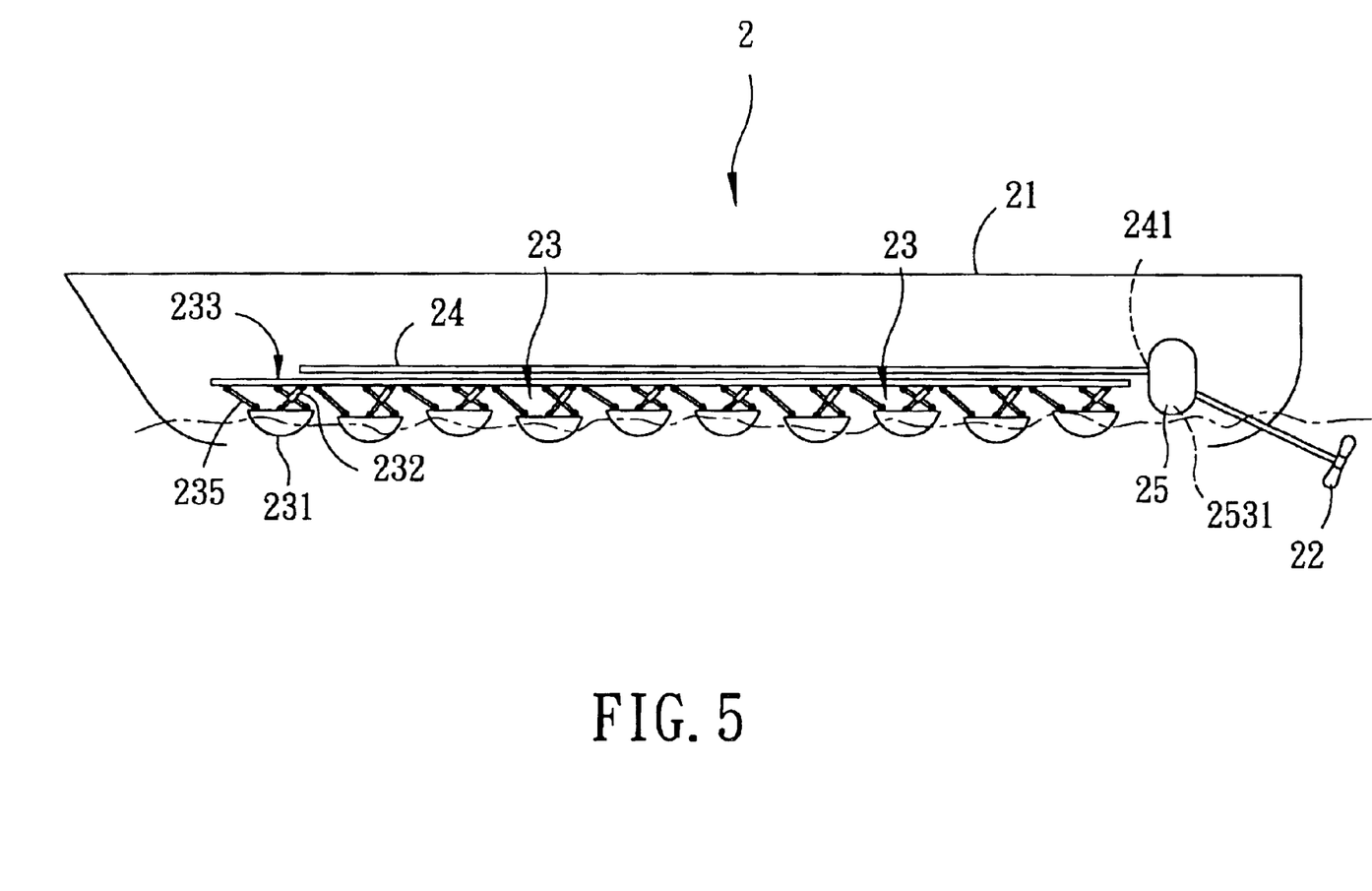
FIG. 5 is a schematic view of a second preferred embodiment of a vessel according to this invention.
Figure 6:
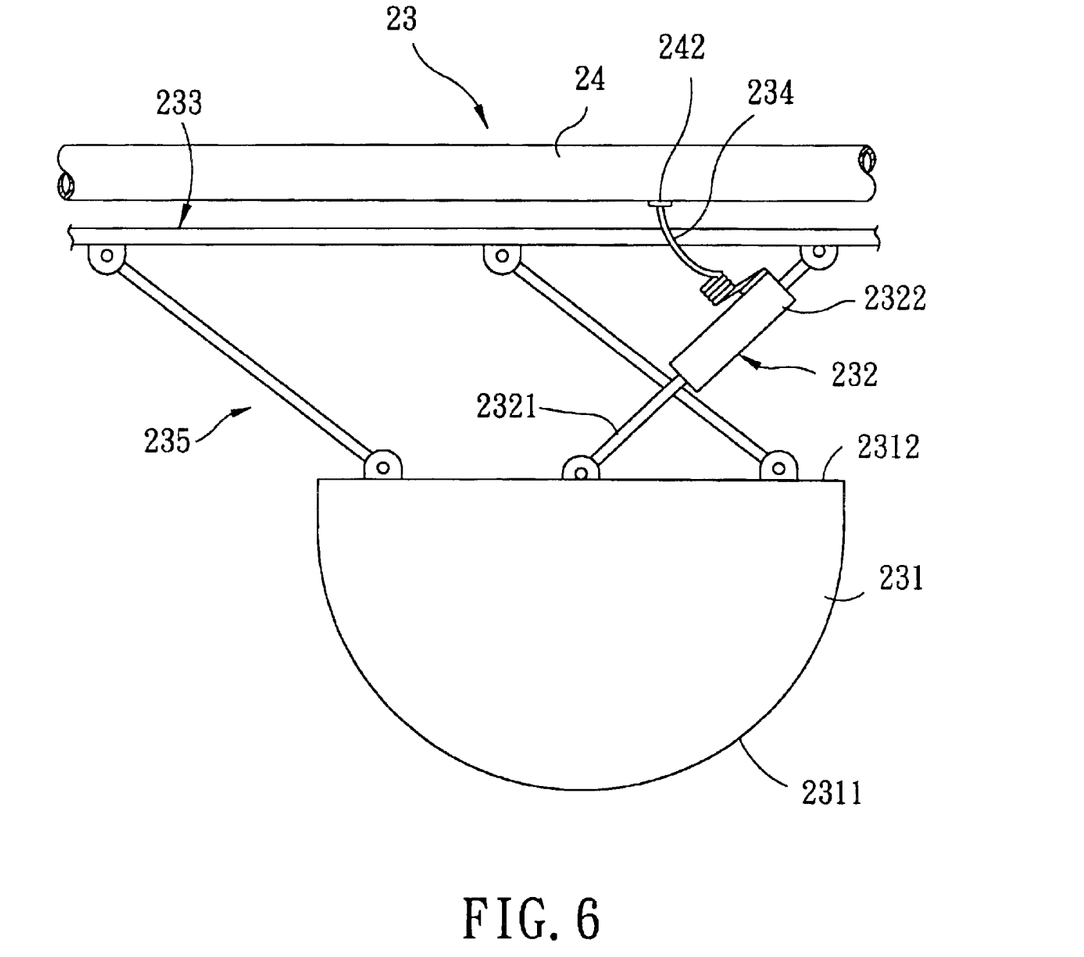
FIG. 6 is an enlarged view of a portion of the vessel of the second preferred embodiment.

Referring to FIGS. 5 and 6, the second preferred embodiment of a wave powered vessel 2 of this invention is shown to comprise a hull body 21 which extends in a longitudinal direction, a propeller 22 which is mounted to be rotatable relative to the hull body 21, and which is adapted to be submerged in water so as to propel the hull body 21 forward, a power converting unit 25, a plurality of power units 23, and a compressed air chamber 24.

Figure 7:
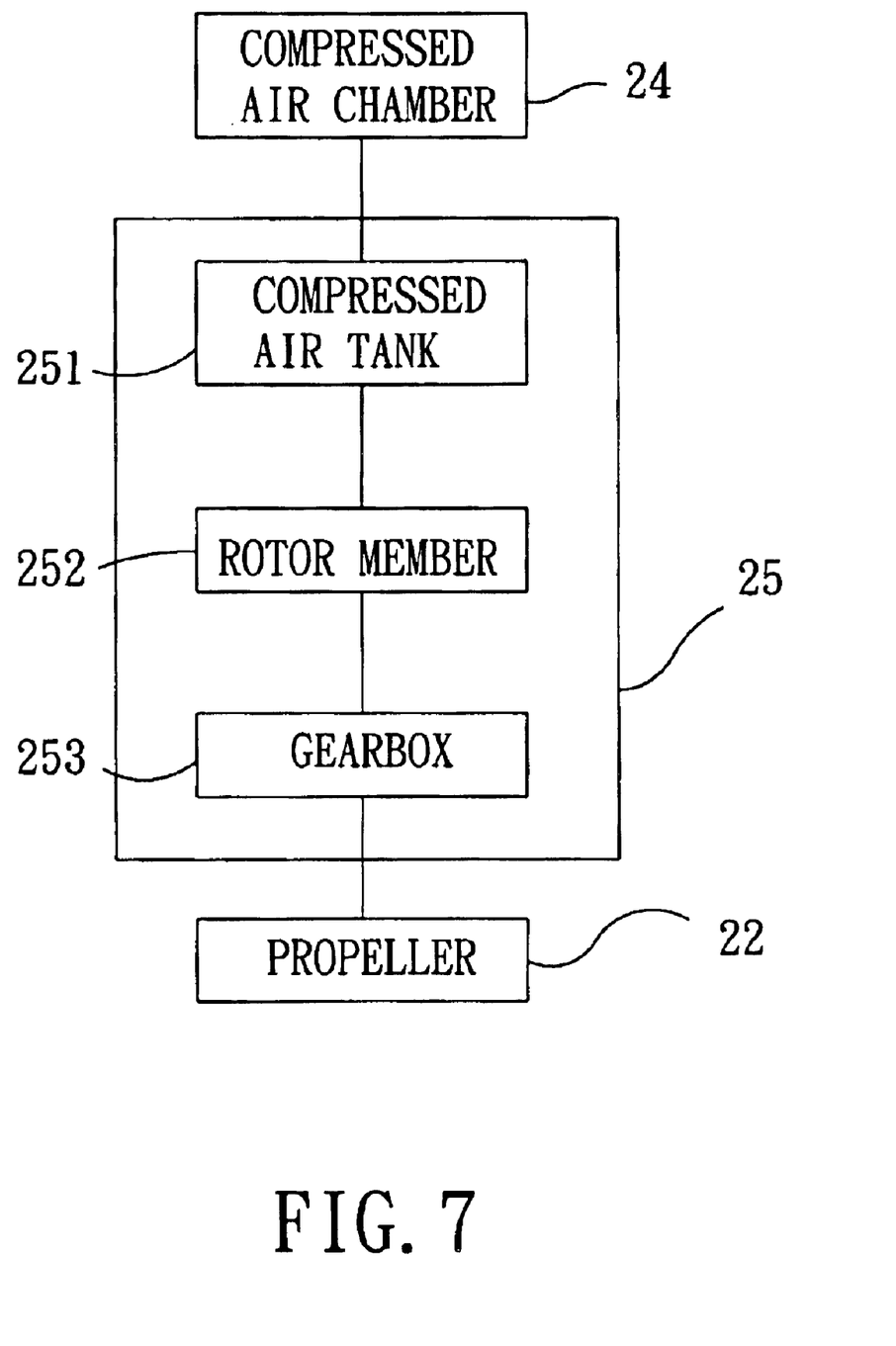
FIG. 7 is a block diagram of a power converting unit of the second preferred embodiment.

With reference to FIG. 7, the power converting unit 25 has a known construction, and includes a compressed air tank 251, a rotor member 252, and a gearbox 253 with a driven shaft 2531 that is mounted to drive the propeller 22 to rotate.

The compressed air chamber 24 is formed as a tube, and is disposed in the hull body 21 to be spaced apart from the water level in an upright direction. The compressed air chamber 24 extends in the longitudinal direction and towards the power converting unit 25, and terminates at an outlet valve 241 that is communicated with the compressed air tank 251 and that permits outflow of air stream into the compressed air tank 251 once the air pressure in the compressed air chamber 24 is higher than a predetermined value. The compressed air chamber 24 further includes a plurality of inlet check valves 242 which are disposed upstream of the outlet valve 241 and which are displaced from one another in the longitudinal direction.

The rotor member 252 of the power converting unit 25 is disposed to be driven by the air stream bursting out of the outlet valve 241, and has an output shaft which is rotated with the rotor member 252 and which is coupled to the driven shaft 2531 of the gearbox 253 so as to drive the propeller 22 to rotate.

A suspending member 233 is mounted on the hull body 21, and extends in the longitudinal direction.

Each of the power units 23 includes a float member 231, a plurality of linking levers 235, a force pump 232, and an air duct 234.

In this embodiment, all the float members 231 of the power units 23 are required to provide a floating force for supporting the vessel 1 on the water. Thus, the numbers of the float members 231 employed is proportional to the carrying capacity of the vessel 2. In addition, the float members 231 are displaced from one another in the longitudinal direction.

The float member 231 is suspended by and is movable relative to the suspending member 232 in the upright direction, and has bottom and top walls 2311,2312 which are opposite to each other in the upright direction and which are respectively adapted to be submerged below and floating above the water level. The linking levers 235 are pivoted to the suspending member 232 and the top wall 2312 of the float member 231 to facilitate movement of the float member 231.

The force pump 232 is disposed to interconnect the float member 231 and the suspending member 233 along a line which is inclined relative to the water level. The force pump 232 includes a piston 2321 which is disposed to extend from the top wall 2312 of the float member 231 along the inclined line, and a cylinder 2322 which is coupled with the piston 2321. The air duct 234 interconnects and is communicated with the cylinder 2322 and a respective one of the inlet check valves 242 of the compressed air chamber 24.

As such, the piston 2321 is movable reciprocatingly relative to the cylinder 2322 to perform an air intake stroke and an air compression stroke during each reciprocating movement when the float member 231 is moved upwards and downwards respectively by the rising and falling tides. Thus, compressed air is delivered through the air duct 234 and the check valve 242 to the compressed air chamber 24 during each air compression stroke. By means of the rotor member 252 which can be driven by the compressed air and the gearbox 253 which can transmit the rotational force of the rotor member to the propeller 22, the propeller 22 can be rotated to propel the hull body 21 forward.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A wave powered vessel comprising:
   a hull body extending in a longitudinal direction;
   a propeller mounted to be rotatable relative to said hull body, and adapted to be submerged in a body of water so as to propel said hull body forward;
   a driven shaft mounted to drive said propeller to rotate;
   a drive transmission shaft which is disposed in and which is rotatable relative to said hull body about a rotation axis, which is adapted to be spaced apart from the water level in an upright direction, and which extends in the longitudinal direction to couple with said driven shaft so as to drive said propeller to rotate;
   a suspending member mounted relative to said hull body, and extending in the longitudinal direction;
   a plurality of float members which are suspended by and which are movable relative to said suspending member in the upright direction, and which are disposed to be displaced from one another in the longitudinal direction, each of said float members including
      bottom and top walls which are opposite to each other in the upright direction, and which are respectively adapted to be submerged below and floating above the water level, and
      a force transmitting rod which is disposed to extend from said top wall uprightly, and which includes a first rack segment disposed to be moved upwards and downwards with said force transmitting rod when a respective one of said float members is moved upwards and downwards respectively by rising and falling tides; and
   a plurality of first gear trains, each including
      a first uni-directional gear unit which has a first toothed wheel that surrounds a first axis, and that is disposed to mesh with said first rack segment so as to be rotated clockwise and counterclockwise, and a first uni-directional gear wheel coupled relative to said first toothed wheel so as to permit said first uni-directional gear wheel to be rotated coaxially with said first toothed wheel only when said first toothed wheel rotates clockwise, and
      a first driven wheel disposed downstream of said first uni-directional gear wheel so as to transmit rotation of said first uni-directional gear wheel to drive said drive transmission shaft, thereby driving said propeller to rotate.

2. The wave powered vessel according to claim 1, wherein said force transmitting rod further includes a second rack segment which is disposed opposite to said first rack segment in a transverse direction transverse to both the upright direction and the longitudinal direction, and which is moved upwards and downwards with said force transmitting rod,
   said wave powered vessel further comprising:
      a plurality of second gear trains, each including
         a second uni-directional gear unit which has a second toothed wheel that surrounds a second axis parallel to the first axis, and that is disposed to mesh with said second rack segment such that, when said first toothed wheel is rotated clockwise and counterclockwise, said second toothed wheel is rotated counterclockwise and clockwise correspondingly, and a second uni-directional gear wheel coupled relative to said second toothed wheel to permit said second uni-directional gear wheel to be rotated coaxially with said second toothed wheel only when said second toothed wheel rotates clockwise, and
         a second driven wheel disposed downstream of said second uni-directional gear wheel such that said first and second uni-directional gear wheels rotate clockwise in an alternate manner to drive said drive transmission shaft, thereby enabling said drive transmission shaft, as well as said propeller, to perform continuous rotary movements when said float members are moved upwards and downwards respectively by the rising and falling tides.

3. The wave powered vessel according to claim 2, further comprising:
   a plurality of guiding rods, each including a lower segment which extends uprightly from said top wall of a respective one of said float members, and an upper segment which extends from said lower segment through and upwardly of said suspending member for guiding upward and downward movements of said float members, and a plurality of upper and lower limit members which are respectively disposed on said upper and lower segments of said guiding rods so as to limit excessive movements of said float members.

4. A wave powered vessel comprising:

a hull body extending in a longitudinal direction;

a propeller mounted to be rotatable relative to said hull body, and adapted to be submerged in a body of water so as to propel said hull body forward;

a driven shaft mounted to drive said propeller to rotate;

a compressed air chamber which is disposed in said hull body, and which is adapted to be spaced apart from the water level in an upright direction, said compressed air chamber extending in the longitudinal direction and towards said driven shaft, and terminating at an outlet valve that permits outflow of an air stream once the air pressure in said compressed air chamber is higher than a predetermined value, said compressed air chamber further including a plurality of inlet check valves disposed upstream of said outlet valve and displaced from one another in the longitudinal direction;

a rotor member which is disposed to be driven by the air stream bursting out of said outlet valve, and which has an output shaft rotated with said rotor member and coupled to said driven shaft so as to drive said propeller to rotate;

a suspending member mounted relative to said hull body, and extending in the longitudinal direction;

a plurality of float members which are suspended by and which are movable relative to said suspending member in the upright direction, and which are displaced from one another in the longitudinal direction, each of said float members including bottom and top walls which are opposite to each other in the upright direction, and which are respectively adapted to be submerged below and floating above the water level; and a plurality of force pumps, each disposed to interconnect a respective one of said float members and said suspending member along a line which is inclined relative to the water level, each of said force pumps including a piston disposed to extend from said top wall of a respective one of said float members along the inclined line, and a cylinder coupled with said piston such that said piston is movable reciprocatingly relative to said cylinder to perform an air intake stroke and an air compression stroke during each reciprocating movement when a respective one of said float members is moved upwards and downwards respectively by the rising and falling tides, thereby delivering compressed air through a respective one of said check valves to said compressed air chamber during the air compression stroke.

* * * * *